July 5, 1949.    P. N. ERICKSON    2,475,280
TOWING APPARATUS
Filed Feb. 24, 1948
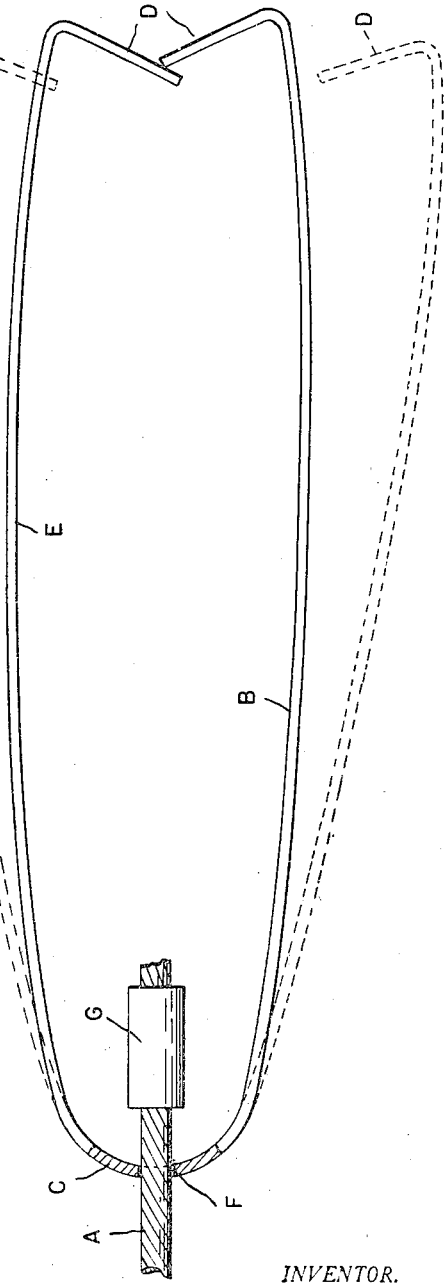
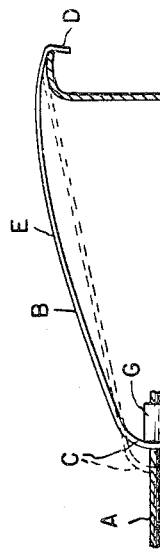
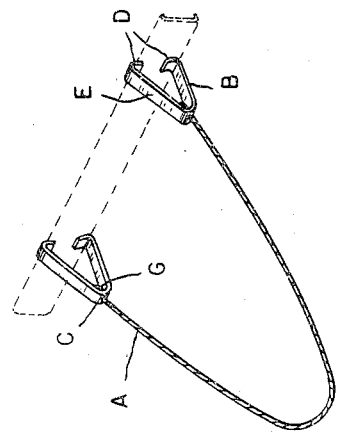
INVENTOR.
PAUL N. ERICKSON
BY
Whittemore Hulbert & Belknap
ATTORNEYS Patented July 5, 1949

2,475,280

UNITED STATES PATENT OFFICE 2,475,280

TOWING APPARATUS

Paul N. Erickson, Detroit, Mich.

Application February 24, 1948, Serial No. 10,369

3 Claims. (Cl. 280—33.14)

The invention relates to towing apparatus of that type in which a cable or other flexible member has secured to opposite ends thereof attachment means for engagement with a bumper or other portion of a motor vehicle and forming, when thus engaged, a cable loop which is centrally attached to the towing car.

It is the object of the invention to obtain a construction of this general type which is provided with quick attachment means adapted to engage various types of bumpers and to be securely fastened thereto so as to avoid accidental disengagement.

It is a further object to obtain a simple construction which can be manufactured at relatively low cost. With these objects in view, the invention consists in the construction as hereinafter set forth.

In the drawings:

Fig. 1 is a perspective view of my improved towing apparatus showing the same as attached to the bumper of a car;

Fig. 2 is a side elevation of one of the attachment members secured to one end of the cable and in its normal position, also indicating in dotted lines its expanded position for engagement with the bumper; and Fig. 3 is a similar view showing in full lines the attachment means engaged with the bumper but not under load and in dotted lines its position when under load.

As illustrated A is the flexible draft member illustrated as a wire cable. B is the attachment member formed of a strip of resilient material, such as tempered steel, having a central return bend C and inturned hooks D at its opposite ends. The portions E between the return bend C and the hooks D are bowed outward and the hooks D are normally in a position to slightly overlap each other and at an angle to extend obliquely inward towards the return bend. At the center of the return bend is an aperture F through which the cable is threaded. Attached to the end of the cable within the return bend is a collar G which is firmly secured thereto by swedging, brazing, or any other suitable means.

With the construction as described, when the towing apparatus is to be attached to a car, the portions E of the fasteners B are pulled apart sufficiently to embrace the bumper of the car, the hooks D engaging the rear side of said bumper. The tension in the member B when thus engaged is sufficient to firmly clamp it to the bumper and to prevent it from falling out of engagement therewith. The center of the loop in the cable can then be attached by any suitable means to the towing car. As shown in Figure 3, when the members B are attached to the bumper but not under load they will assume the position shown in full lines, but when a pull is exerted on the cable the bowed portions E will be straightened. Thus the shock of picking up the inertial load is cushioned avoiding danger of overstressing any of the parts. The bows E are also advantageous for engagement with certain types of bumpers which are rounded outward in advance of their rear edge portions. This simple construction of towing apparatus is adapted for engagement with all types of bumpers now in general use and when once engaged will effectively prevent accidental disengagement which frequently occurs with other towing means.

What I claim as my invention is:

1. A towing apparatus, comprising a flexible draft member and an attachment means secured to an end thereof formed of a resilient strip having a central return bend therein and inturned hooks at its opposite ends normally in proximity to each other, said return bend having a central aperture through which the end of the flexible draft member is passed, and a collar securely attached to said end portion and forming a draft shoulder.

2. A towing apparatus, comprising a flexible draft member and an attachment device secured to an end thereof being formed of a resilient strip having a central return bend therein and inturned hooks at its opposite ends normally in proximity to each other, the portions on opposite sides of said return bend being adapted for spreading apart to engage the hooks with a bumper or other portion of the member to be towed with sufficient resilient pressure to retain such engagement, said return bend having a central aperture therethrough for the passage of an end portion of the flexible draft member, and a collar secured to said end portion to form a draft shoulder.

3. A towing apparatus, comprising a flexible draft member and an attachment device secured to an end thereof formed of a resilient strip having a central return bend therein apertured for attachment thereto of said flexible draft member and inturned hooks at the opposite ends normally in proximity to each other, the portions extending between said return bend and said hooks being outwardly bowed and being capable of spreading sufficiently for clamping engagement of said hooks with a bumper or other part of the member to be towed, said bowed portion being straightened when under draft and forming a resilient cushion for picking up the load.

PAUL N. ERICKSON.

No references cited.